United States Patent [19]

Ratkowski et al.

[11] 4,419,505

[45] Dec. 6, 1983

[54] CONTACT LENS COMPOSITION, ARTICLE AND METHOD OF MANUFACTURE

[75] Inventors: Donald J. Ratkowski, Mesa; Ping-Chang Lue, Scottsdale, both of Ariz.

[73] Assignee: Paragon Optical, Inc., Mesa, Ariz.

[21] Appl. No.: 398,423

[22] Filed: Jul. 14, 1982

[51] Int. Cl.³ .............................................. C08F 30/08
[52] U.S. Cl. .................................... 526/279; 264/1.1;
264/2.2; 351/160 R; 351/160 H; 523/107;
528/26; 528/32; 525/100
[58] Field of Search ................... 526/279; 351/160 R,
351/160 H; 523/107; 264/1.1, 2.2; 528/26, 32;
525/100

[56] References Cited

U.S. PATENT DOCUMENTS

| | | | |
|---|---|---|---|
| 3,808,178 | 4/1974 | Gaylord | 526/279 |
| 4,152,508 | 5/1979 | Ellis et al. | 526/279 |
| 4,168,112 | 9/1979 | Ellis et al. | 427/164 |
| 4,168,122 | 9/1979 | Levin | 355/113 |
| 4,216,303 | 8/1980 | Novicky | 526/279 |
| 4,242,483 | 12/1980 | Novicky | 526/279 |

Primary Examiner—Melvyn L. Marquis
Attorney, Agent, or Firm—Richard R. Mybeck

[57] ABSTRACT

A copolymer composition, specially adapted for use in fabricating a contact lens comprises a copolymer of comonomers which include about 1–95 parts by weight of hydroxy silane esters of acrylic or methacrylic acid and about 99–5 parts by weight of a $C_1$–$C_{20}$ alkanol ester of acrylic or methacrylic acid.

Contact lenses and contact lens blanks are formed of such copolymer by conventional techniques and also by injection molding.

4 Claims, No Drawings

CONTACT LENS COMPOSITION, ARTICLE AND METHOD OF MANUFACTURE

This invention relates to novel copolymer compositions.

In another aspect, the invention relates to novel articles of manufacture such as contact lenses fabricated from said copolymers.

In still another respect, the invention pertains to a novel method for manufacturing contact lenses comprising injection molding or casting such compositions to form the shaped lenses.

In still another respect, the invention concerns oxygen-permeable copolymers which have improved wettability and mechanical stability, which can be used to manufacture contact lenses by industry-standard manufacturing techniques and also by injection molding or casting. These lenses can be cleaned with standard hard and soft contact lens cleaning solutions and do not require special surface treatments to impart wettability.

So-called "hard" contact lenses and compositions for fabricating them are well known in the art. The standard contact lens used for many years is fabricated from polymethyl methacrylate (PMMA) and has achieved widespread use throughout the world, despite the fact that the PMMA lenses are essentially impermeable to oxygen. The lack of oxygen at the interface between the contact lens and the eyeball will, after short periods of time, even less than one day, cause discomfort to the wearer because of edema induced by the lack of oxygen at the surface of the eyeball. Consequently, PMMA lenses must be removed daily to expose the surface of the eyeball to ambient atmospheric oxygen and then replaced, a bothersome procedure.

In an attempt to remedy these defects in standard PMMA contact lenses, the art has devised other copolymer contact lens compositions having improved oxygen-permeability which allow the user to wear the lenses for longer periods of time, upwards of several days, before removal for cleaning. These oxygen-permeable lenses are of two general types, the so-called "soft" lens formed of a very flexible hydrogel material and the so-called "hard permeable" lens formed of a solid copolymer of polymethyl methacrylate with various comonomers. The hard permeable lenses avoid certain problems associated with the so-called soft lens, principally in their resistance to contamination, ease of cleaning and scratch resistance.

Although the hard permeable contact lens compositions do represent a marked improvement over standard PMMA polymers in terms of oxygen-permeability, they nevertheless suffer certain disadvantages in comparison to standard PMMA lenses in terms of wettability, mechanical stability and chemical stability. Moreover, certain of the present hard permeable copolymers require special surface pre-treatments to improve wettability and/or special lens treatment solutions which are used throughout the life of the lens to improve or maintain surface properties.

Accordingly, it would be highly advantageous to provide a hard oxygen-permeable contact lens composition, lenses manufactured therefrom and methods for manufacture thereof, which provide contact lenses having at least the oxygen-permeability exhibited by present hard permeable lenses, which have improved wettability, which can be used to manufacture contact lenses according to standard procedures already known in the art in connection with the manufacture of PMMA lenses, which can also be fabricated directly into contact lenses by injection molding and which do not require special surface pre-treatments or periodic surface treatments to attain and maintain the desired surface properties.

We have now discovered contact lens copolymer compositions, contact lenses fabricated therefrom and methods for manufacture of contact lenses employing such compositions which achieve these desired objectives.

Briefly, the contact lens composition of the present invention comprises a copolymer of comonomers which include (a) silanes and (b) alkanol esters of acrylic or methacrylic acids. The silanes may contain two components: (1) a hydroxy acrylate or methacrylate silane, and, optionally, (2) an alkyl-alkoxy silane.

The invention also provides, as new articles of manufacture, contact lenses fabricated from these copolymers and new methods of manufacturing contact lenses by injection molding or casting these copolymers to the desired contact lens shape.

The invention will be best understood by reference to the prior art.

The closest prior art of which we are aware are the copolymers and articles of manufacture described in U.S. Pat. No. 3,808,178 to Gaylord, issued Apr. 30, 1974, entitled "Oxygen-Permeable Contact Lens Composition, Method and Article of Manufacture." Contact lenses fabricated from compositions such as those described in the Gaylord patent are marketed commercially under the trademark "Polycon". The copolymers described in the Gaylord patent are copolymers of polysiloxanyl acrylic esters and an alkyl acrylic ester such as, for example, as described in Example 2 of the Gaylord patent, a copolymer of 35 parts of pentamethyl disiloxanylmethyl methacrylate and 65 parts of methyl methacrylate or, as described in Example 16, a copolymer of methyl methacrylate (60 parts) and tris(trimethylsiloxy)-γ-methacryloxy-propylsilane (40 parts). Gaylord also discloses that other comonomers can be employed to improve certain of the properties of these copolymers, such as comonomers which improve the wettability of the copolymer, e.g., acrylic or methacrylic acid, and crosslinking comonomers which improve the rigidity of the copolymer, e.g., ethyleneglycol dimethacrylate.

Other known hard oxygen-permeable contact lens copolymers of silanes and acrylic esters are disclosed in the U.S. patents to Ellis et al., U.S. Pat. No. 4,168,112 (known in the industry as the Boston polymer) and U.S. Pat. No. 4,152,508, and the U.S. patents to Novicky, U.S. Pat. No. 4,216,303 (known in the industry as the Sil-O$_2$-Flex polymer) and U.S. Pat. No. 4,242,483.

The Ellis patents disclose contact lens copolymers of acrylic esters, siloxanylalkyl esters, an itaconate mono or diester, a cross-linking agent such as ethyleneglycoldimethacrylate and a hydrophilic monomer such as 2-hydroxyethyl methacrylate. Ionic charges are established on the surfaces of lenses fabricated from these compositions by treating the lenses with a solution which forms a hydrophilic polyelectrolyte hydrogel complex on the surface of the lens.

The Novicky copolymers are generally similar to the Gaylord and Ellis copolymers but employ generally much more highly branched silane comonomers.

While the contact lens copolymers of the present invention bear similarities to the Gaylord, Ellis and Novicky copolymers (in that they are copolymers of alkanol acrylic esters with silane acrylic esters), they differ in that the silane components are a hydroxy acrylic or methacrylic ester silane and, optionally, an alkyl-alkoxy silane. In addition, the silane monomers disclosed by Gaylord, Ellis and Novicky can be incorporated in the copolymer, if desired. The hydroxyacrylic ester silane and the acrylic or methacrylic alkanol esters of the prior art yield a copolymer which has distinctly improved wettability and mechanical stability, enabling one to manufacture contact lenses from the copolymers of this invention by industry-standard techniques known in connection with the manufacture of PMMA lenses, and enabling one to care for and clean the lenses fabricated from the copolymer of this invention with standard hard and soft contact lens cleaning solutions. The mechanical stability of our copolymer provides lenses having improved stability of lens curvature which affects focus distance and sharpness. No surface treatment is required to improve lens wettability and no special cleaning solutions are required to maintain surface properties.

In general, the contact lens copolymer compositions of the present invention are formed by copolymerizing comonomers which include about 1-95 parts by weight of a hydroxy silane ester and, correspondingly, about 99-5 parts by weight of a $C_1$-$C_{20}$ alkanol ester of acrylic or methacrylic acid.

The hydroxy silane esters which are useful as comonomers in forming the copolymer of the present invention are of the generalized structure $$CH_2=\overset{R}{\underset{|}{C}}-\overset{O}{\underset{||}{C}}-O-(CH_2)_n-\left[\begin{array}{c}X\\|\\Si\\|\\Y\end{array}\right]_m-OH$$

where
R=CH$_3$—, H—
X,Y=$C_1$-$C_6$ alkyl, phenyl, Z

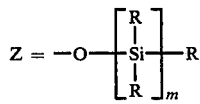

n=1-3
m=1-5

Representative hydroxy silane esters of this type include:
hydroxy-di(trimethylsiloxy)-γ-methacryloxypropyl silane
hydroxy-methyl(trimethylsiloxy)methacryloxymethyl silane
hydroxy-methyl(trimethylsiloxy)methacryloxyethyl silane
hydroxy-methyl(trimethylsiloxy)methacryloxypropyl silane
hydroxy-di(trimethylsiloxy)-γ-methacryloxyethyl silane
hydroxy-di(trimethylsiloxy)-methacryloxy methyl silane
hydroxy-(trimethylsiloxy)-(pentamethyldisiloxy)-methacryloxy-methylsilane
hydroxy-(trimethylsiloxy)-(pentamethyldisiloxy)-γ-methacryloxyethyl silane
hydroxy-(trimethylsiloxy)-(pentamethyldisiloxy)-γ-methacryloxypropyl silane The alkyl-alkoxy silanes which are useful as comonomers in forming the copolymer of the present invention have the general structure

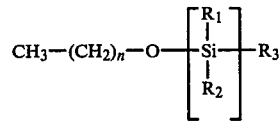

where
$R_1$, $R_2$ and $R_3$=$C_1$-$C_6$ Alkyl
n=an integer from about 1-3
Representative alkyl alkoxy silanes of this type include:
trimethyl-ethoxy-silane
trimethyl-methoxy-silane
dimethyl-(trimethylsiloxy)-methoxy-silane
dimethyl-(trimethylsiloxy)-ethoxy-silane
dimethyl-(pentamethyldisiloxy)-methoxy-silane
dimethyl-(phenyltetramethyldisiloxy)-methoxy-silane The $C_1$-$C_{20}$ alkanol esters of acrylic or methacrylic acid which are useful as comonomers in forming the copolymer of the present invention include:
methyl acrylate and methacrylate
ethyl acrylate and methacrylate
propyl acrylate and methacrylate
isopropyl acrylate and methacrylate
butyl acrylate and methacrylate
amyl acrylate and methacrylate
hexyl acrylate and methacrylate
heptyl acrylate and methacrylate
octyl acrylate and methacrylate
2-ethylhexyl acrylate and methacrylate
nonyl acrylate and methacrylate
decyl acrylate and methacrylate
undecyl acrylate and methacrylate
lauryl acrylate and methacrylate
cetyl acrylate and methacrylate
octadecyl acrylate and methacrylate The copolymers of the invention are prepared by contacting the mixture of comonomers with a free radical generating polymerization initiator of the type commonly used in polymerizing ethylenically unsaturated compounds. Representative free radical polymerization initiators include:
acetyl peroxide
lauroyl peroxide
decanoyl peroxide
caprylyl peroxide
benzoyl peroxide
tertiarybutyl peroxypivalate
diisopropyl peroxycarbonate
tertiarybutyl peroctoate
α,α'-azobisisobutyronitrile
methylethyl ketone peroxide
di(2-phenoxyethyl)peroxydicarbonate
di(2-phenoxyethyl)methylethyl ketone peroxide Conventional polymerization techniques are employed to produce the novel copolymers. The comonomer mixture containing between about 0.05-2% by weight of the free radical initiator is heated to a temperature between 30° C.–100° C., preferably below 70° C., to initiate and complete the polymerization.

The polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from ethylenically unsaturated monomers. The copolymer thus produced may be extruded, pressed or molded into rods, sheets or other convenient shapes which are then machined to produce the contact lenses. Alternatively, the copolymer can be directly cast or molded into finished contact lenses or lens blanks with convex or concave surfaces.

If the wettability of the copolymers described above is lower than desired, this property can be improved by the addition to the copolymerization mixture of from about 1-20 parts by weight of a hydrophilic monomer. Such monomers include hydroxyalkyl acrylates and methacrylates wherein the alkyl group contains about 1 to 4 carbon atoms, acrylic and methacrylic acid, acrylamide, methacrylamide, N-methylolacrylamide, N-methylolmethacryliamide, glycidyl acrylate and methacrylate and N-vinyl-pyrrolidone.

The resistance of contact lenses fabricated from the copolymer of the present invention to lens flexure and warpage may be increased, if desired, by the incorporation into the copolymerization mixture of about 1-2 parts by weight of an acrylic ester of a $C_1$-$C_{20}$ alkanol polyol such as, for example, ethylene glycol dimethacrylate, butylene glycol dimethacrylate, neopentyl glycol diacrylate and pentaerythritol triacrylate or tetraacrylate.

The principal function of the hydroxy silane ester moiety of the copolymer of the present invention is to improve the mechanical properties of conventional PMA or PMMA contact lens polymers. It appears that the inclusion of the hydroxy silane ester as one of the comonomers in the polymerization mixture chiefly affects the warpage characteristics of the copolymer which, in turn, as previously noted, determines the stability of lens curvature which controls focus distance and sharpness. In addition, the hydroxy silane ester moiety of the copolymer imparts significantly improved oxygen permeability. Consequently, although the hydroxy silane ester component of the copolymerization mixture may be varied within the 1-95 parts range set forth above, in order to achieve the desired combination of mechanical and oxygen-permeability properties, it is preferred to employ about 1-10 parts by weight of the hydroxy silane ester in the copolymerization mixture. Higher proportions of this component can be employed but with some sacrifice in the optical properties of the copolymer.

The optional alkyl-alkoxy silane component of the copolymerization mixture is incorporated in order to effect an in situ adjustment of the hydroxy silane content of the copolymerization mixture. As often commercially supplied, the hydroxy silane component may contain substantial proportions of other silane esters. The alkyl-alkoxy silane may be added to the copolymerization mixture to convert a portion of the hydroxy silane to the corresponding silane ester, according to the generalized reaction

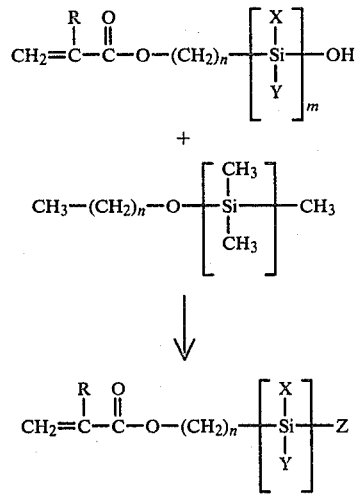

wherein
m, n, X and Y have the meanings previously assigned, and
Z=X or Y.

Accordingly, the alkyl-alkoxy silane component of the copolymerization mixture can be varied from 0 parts by weight up to a stoichiometric proportion which will leave about 1 part by weight of the hydroxy silane in the unreacted state according to the equation above.

The hydrophilic monomer content of the copolymerization mixture is preferably 2-6 parts by weight and the proportion of the alkanol polyol component is preferably 3-8 parts by weight.

Within the foregoing limitations, the proportion of $C_1$-$C_{20}$ alkanol esters of acrylic or methacrylic acids in the copolymerization mixture is, correspondingly, preferably 25-60 parts by weight.

The particular free radical polymerization initiator employed in accordance with the preferred practice of the invention is selected by reference to the required initiation temperature. Thus, if conventional polymerization techniques are employed to produce cast rods or other shapes which are then machined to produce the contact lenses, the preferred initiators are
α,α'-azobisisobutyronitrile, and
di(2-phenoxyethyl) peroxydicarbonate.
On the other hand, if it is desired to produce contact lenses or contact lens blanks by injection molding or direct casting, then one employs a polymerization initiator having a higher initiation temperature, in order to prevent premature polymerization in the injection molding or casting cavities, e.g. methylethylketoneperoxide and cobalt naphthanate.

EXAMPLES

The following examples are set forth for purposes of illustrating the presently preferred practice of the invention and are not intended as limitations on the scope thereof.

EXAMPLE 1

A copolymerization mixture is prepared by mixing the following comonomers in the relative weight ratios indicated in a stirred plastic mixing container for 20 minutes.

TABLE A

| Comonomer | Parts by Weight |
| --- | --- |
| Silane | |
| Hydroxy-di(trimethylsiloxy)-γ-methacryloxypropyl-silane | 30 |
| Trimethyl-ethoxy-silane | 10 |
| Alkanol Ester | |
| Methyl Methacrylate | 49 |
| Hydrophilic Monomer | |
| Methacrylic Acid | 4 |
| Cross-Linking Monomer | |
| Ethylene Glycol Dimethacrylate | 7 |
| Catalyst (Initiator) | |
| α,α'-azobisisobutyronitrile | 0.2 |

This copolymerization mixture is poured into teflon-coated aluminum tubes which have been thoroughly cleaned with a dry brush and an antistatic air gun to remove all particulates. The filled tubes are placed in a water bath which is, in turn, placed in a vacuum oven. The vacuum pump is started and air evacuation is continued to approximately −2 atmospheres, at which time the vacuum pump is stopped and the oven is charged with nitrogen to atmospheric pressure. The evacuation-nitrogen charge step is repeated four times, after which a very slight positive nitrogen flow is continued through the oven.

The oven is heated to 40° C. for 48 hours and the temperature is then increased to 60° C. for an additional 24 hours. The oven is cooled to room temperature and the copolymer rods are removed from the polymerization tubes by gently tapping the bottoms of the tubes.

The copolymer rods are post-cured by placing them flat in teflon-coated aluminum trays which are placed in a vacuum oven. The oven is evacuated to approximately −2 atmospheres and the oven is heated to 118° C. for 12 hours. The oven is cooled to 50° C., at which time air is slowly admitted into the oven until the oven reaches atmospheric pressure and the trays containing the post-cured rods are removed.

EXAMPLE 2

10 contact lens buttons (approximately 13 mm in diameter and 4 mm thick) are prepared by cutting one of the rods of the copolymer of Example 1, "facing" one flat surface of each of the buttons with a diamond turning tool and polishing the faced surfaces to the degree normally acceptable by contact lens standards. After immersing the buttons in a cleaning solution for 24 hours, each is thoroughly washed with distilled water, blotted dry, and then thoroughly dried under vacuum in a 40° C. oven for one week. After this preparation, the buttons are subjected to wetting angle determinations as described in the "Standard Method for Determining Wetting Angle", issued by the Contact Lens Manufacturers Association, Chicago, Ill., dated Apr. 10, 1978, with the following results:

TABLE B

| Button No. | Wetting Angle (Degrees) | Standard Deviation (±°) |
| --- | --- | --- |
| 1 | 30 | 2.0 |
| 2 | 23.3 | 2.0 |
| 3 | 23.7 | 1.5 |
| 4 | 22.0 | 3.0 |
| 5 | 23.3 | 1.5 |
| 6 | 21.0 | 2.0 |
| 7 | 22.7 | 2.3 |
| 8 | 21.0 | 1.0 |
| 9 | 21.0 | 0 |
| 10 | 23.0 | 1.0 |

This data gives an average wetting angle of 23.1° with a standard deviation of ±1.63%.

EXAMPLE 3

For comparison, the wetting angles of other commercially available contact lens polymers and copolymers were determined utilizing the same procedure.

TABLE C

| Polymer | Wetting Angle Degrees | Standard Deviation (±Degrees) |
| --- | --- | --- |
| PMMA #2 | 25.6 | 1.77 |
| PMMA #4 | 24.3 | 3.8 |
| Polycon (Gaylord) | 30.4 | .77 |
| Sil-O$_2$—Flex (Novicky) | 25.4 | — |
| Boston (Ellis) | 33.3 | — |

EXAMPLE 4

The contact lens copolymers of Examples 2 and 3 were tested for oxygen-permeability with a Schema-Versatae machine with the following results:

TABLE D

| Polymer | O$_2$ Permeability (DK × $10^{-11}$)* |
| --- | --- |
| PMMA #2 | <1 |
| PMMA #4 | <1 |
| Polycon (Gaylord) | 3.8 |
| Sil-O$_2$—Flex (Novicky) | 7.5 |
| Boston (Ellis) | 11.1 |
| Ex. 1 | 12.2 |

*(CM$^2$/sec) (ml O$_2$/ml · mm Hg)

EXAMPLES 5–9

Following the general procedures of Example 1, copolymers are prepared which, depending on the specific application, have a desired combination of mechanical strength, optical clarity, oxygen permeability and wettability for use in fabricating contact lenses.

TABLE E

| Comonomer | Parts by weight in copolymerization mixture Example: | | | | |
| --- | --- | --- | --- | --- | --- |
| | 5 | 6 | 7 | 8 | 9 |
| Hydroxy-di-(trimethylsiloxy)-methacrolxypropyl-silane | 35 | 30 | 60 | 20 | 6 |
| Trimethyl-ethoxy-silane | 15 | 10 | 10 | 10 | 4 |
| Methylmethacrylate | 40 | 50 | 20 | 60 | 80 |
| Methacrylic acid | 2 | 4 | 3 | 2 | 6 |
| Ethylene glycol dimethacrylate | 8 | 6 | 7 | 8 | 4 |
| Initiator | | | | | |
| α,α'azobisisobutyronitrile | 0.2 | 0.2 | | | |
| di-(2-phenoxyethyl) peroxydicarbonate | | | 0.2 | | |
| Methylethylketoneperoxide and cobalt naphthanate | | | | 0.2 | 0.2 |

EXAMPLES 10-19

Following the general procedures of Example 1, copolymers are prepared of other comonomers, which, depending on the specific desired balance of properties of mechanical strength, resistance to warpage, optical characteristics, oxygen permeability and wettability, are suitable for use in fabricating contact lenses according to the present invention.

TABLE E

| Comonomer | Parts by Weight in Copolymerization Mixture Example: | | | | | | | | | |
|---|---|---|---|---|---|---|---|---|---|---|
| | 10 | 11 | 12 | 13 | 14 | 15 | 16 | 17 | 18 | 19 |
| A1 | 10 | | | | | 5 | | | | |
| 2 | 50 | 50 | | | 30 | 15 | 20 | 15 | 10 | 6 |
| 3 | | | 45 | 40 | | | | | 5 | |
| B1 | 10 | | | | 10 | | 10 | 5 | | |
| 2 | | | | 10 | 10 | | | | 5 | 5 |
| 3 | | 10 | 15 | | | | | | | |
| C | 20 | 30 | 30 | 40 | 50 | 60 | 60 | 70 | 70 | 80 |
| D1 | 4 | | | | 4 | | | 7 | | |
| 2 | | | | 2 | | | | | 4 | 6 |
| 3 | | | 6 | 6 | | 2 | 3 | | | |
| E1 | 6 | | | 4 | 8 | 6 | | 6 | | |
| 2 | | 4 | | | | 8 | | 3 | | 3 |
| F1 | 0.2 | | | | 0.2 | 0.2 | | | | |
| 2 | | | 0.2 | 0.2 | | | | 0.2 | | 0.2 |
| 3 | | | | | | 0.2 | | | 0.2 | 0.2 |

Identification of Copolymerization Mixture Components of Examples 10-19
A1. Hydroxy-methyl-(trimethylsiloxy)methacryloxymethyl-silane
  2. Hydroxy-di(trimethylsiloxy)-methacryloxypropyl-silane
  3. Hydroxy-methyl-(trimethyl)methacryloxypropyl-silane
B1. Trimethyl-ethoxy-silane
  2. Trimethyl-methoxy-silane
  3. Dimethyl-(trimethylsiloxy)-methoxy-silane
C Methylmethacrylate
D1. Methacrylic acid
  2. Acrylic acid
  3. Acrylamide
E1. Ethylene glycol-dimethacrylate
  2. Butyleneglycol-dimethyacrylate
F1. Di(2-phenyloxyethyl)peroxy dicarbonate
  2. α,α'-azobisisobutylronitrile
  3. Methylethylketoneperoxide and cobalt naphthanate

EXAMPLE 20

The copolymers of Examples 8, 9, 15 and 18 are suitable for injection molding according to art-recognized techniques. For example, these copolymers can be injection molded to form convex or concave surfaced contact lenses or lens blanks at suitable process parameters indicated below.

TABLE F

| Mold Temperature | 100° C.-160° C. |
|---|---|
| Injection Pressure | 600 psi-2500 psi |
| Hold Pressure | 50 psi-500 psi |
| Hold Time | 2 sec.-120 sec. |
| Injection Time | 1 sec.-5 sec. |

Having described our invention in such terms as to enable those skilled in the art to understand and practice it, and having identified the presently preferred embodiments thereof,

We claim:

1. A copolymer composition, specially adapted for use in fabricating a contact lens, comprising a copolymer of copolymerized comonomers including:

(a) about 1-95 parts by weight of a hydroxy ester silane of the structure $$CH_2=C-C-O-(CH_2)_n-\left[\begin{array}{c} X \\ | \\ Si \\ | \\ Y \end{array}\right]_m-OH$$

with R and O substituents on the central carbon where
R=CH$_3$—, H—
X, Y=C$_1$-C$_6$ Alkyl, phenyl, Z $$Z = -O-\left[\begin{array}{c} R \\ | \\ Si \\ | \\ R \end{array}\right]_m-R$$

n=1-3
m=1-5 and (b) an alkyl-alkoxy silane of the structure $$CH_3-(CH_2)_n-O-\left[\begin{array}{c} R_1 \\ | \\ Si \\ | \\ R_2 \end{array}\right]-R_3$$

where
$R_1$, $R_2$ and $R_3$—C$_1$-C$_6$ Alkyl
n=an integer from 1-3,
said alkyl-alkoxy silane being present in an amount of 0 parts by weight to just below stoichiometric with respect to said hydroxy ester silane; and (c) about 99-5 parts by weight of a C$_1$-C$_{20}$ alkanol ester of acrylic or methacrylic acid.

2. As a new article of manufacture, a contact lens fabricated from the composition of claim 1.

3. As a new article of manufacture, a contact lens blank fabricated from the composition of claim 1.

4. A method for manufacturing a contact lens comprising injection molding the composition of claim 1 to form said lens as a shaped article.

* * * * *